(12) United States Patent
Sutherland et al.

(10) Patent No.: US 10,816,702 B2
(45) Date of Patent: Oct. 27, 2020

(54) REFLECTIVE OPTICAL ELEMENT WITH HIGH STIFFNESS SUBSTRATE

(71) Applicant: Corning Incorporated, Corning, NY (US)

(72) Inventors: James Scott Sutherland, Corning, NY (US); Leonard Gerard Wamboldt, Sunderland, MA (US); Kenneth Smith Woodard, New Boston, NH (US)

(73) Assignee: Corning Incorporated, Corning, NY (US)

( * ) Notice: Subject to any disclaimer, the term of this patent is extended or adjusted under 35 U.S.C. 154(b) by 86 days.

(21) Appl. No.: 15/455,654

(22) Filed: Mar. 10, 2017

(65) Prior Publication Data

US 2018/0231698 A1 Aug. 16, 2018

Related U.S. Application Data (60) Provisional application No. 62/310,201, filed on Mar. 18, 2016.

(51) Int. Cl.
 *G02B 5/08* (2006.01)
 *G02B 1/02* (2006.01)
 (Continued)

(52) U.S. Cl.
 CPC .............. *G02B 5/08* (2013.01); *G02B 1/02* (2013.01); *G02B 1/04* (2013.01); *G02B 1/14* (2015.01)

(58) Field of Classification Search
 CPC . G02B 5/08; G02B 7/182; G02B 1/02; G02B 1/04; G02B 26/105; G02B 5/0891;
 (Continued)

(56) References Cited

U.S. PATENT DOCUMENTS 3,969,131 A 7/1976 Fatzer et al.
4,268,124 A 5/1981 Lui
(Continued)

FOREIGN PATENT DOCUMENTS

EP 1977816 8/2011
FR 2552554 A1 3/1985
(Continued)

OTHER PUBLICATIONS

Peter C. Chen et al., "Graphite fiber strengthens lightweight mirror", Laser Focus World, May, 2001.
(Continued)

*Primary Examiner* — Balram T Parbadia
(74) *Attorney, Agent, or Firm* — Kevin L. Bray (57) ABSTRACT

A high stiffness substrate for optical elements is described. The substrate includes a graphite finishing layer and a non-oxide ceramic base substrate. The non-oxide ceramic base substrate is preferably a carbide, such as boron carbide or silicon carbide. The graphite finishing layer may include a surface with low finish. Low finish may be achieved by diamond turning the graphite surface. The graphite finishing layer may be joined to the non-oxide base ceramic with a solder. A supplemental finishing layer may be formed on the graphite finishing layer. A reflective stack may be formed on the graphite or supplemental finishing layer. Methods for making the substrate are also described.

28 Claims, 6 Drawing Sheets

(51) Int. Cl.
*G02B 1/14* (2015.01)
*G02B 1/04* (2006.01)

(58) Field of Classification Search
CPC ....... G02B 7/183; C23C 16/01; C23C 16/325; C23C 16/26; H01L 2924/0002; H01L 2924/00; H01L 21/02115; H01L 21/02362; H01L 21/0237; H01L 21/02381; H01L 21/02395; H01L 21/02425; H01L 21/0243; H01L 21/02439; H01L 21/02444; H01L 21/02458; H01L 21/02488; H01L 21/02502; H01L 21/02513; H01L 21/02521; H01L 21/02527; H01L 21/02532; H01L 21/0254; H01L 21/02546; H01L 21/0262; H01L 21/02658; H01L 21/0405; H01L 21/3146; H01L 21/3148; H01L 21/6835; H01L 21/76256; H01L 2221/68363; H01L 23/3732; H01L 2924/09701; H01L 29/1602

See application file for complete search history.

(56) References Cited

U.S. PATENT DOCUMENTS

| | | | | |
|---|---|---|---|---|
| 4,376,803 A | * | 3/1983 | Katzman | C22C 49/14 427/226 |
| 4,466,700 A | | 8/1984 | Christiansen et al. | |
| 4,623,228 A | | 11/1986 | Galasso et al. | |
| 4,659,548 A | * | 4/1987 | Gubbay | B22F 1/0003 359/883 |
| 4,997,678 A | | 3/1991 | Taylor et al. | |
| 5,071,596 A | | 12/1991 | Goela | |
| 5,448,418 A | * | 9/1995 | Hotate | B82Y 10/00 359/584 |
| 5,565,052 A | | 10/1996 | Papenburg | |
| 5,825,565 A | | 10/1998 | Papenburg | |
| 5,912,777 A | * | 6/1999 | Jaworske | G02B 5/0808 359/883 |
| 6,377,655 B1 | | 4/2002 | Murakami et al. | |
| 6,749,309 B1 | | 6/2004 | Kaplan et al. | |
| 8,733,955 B1 | | 5/2014 | De Smitt | |
| 9,488,760 B2 | | 11/2016 | Ballou et al. | |
| 2004/0165296 A1 | | 8/2004 | Schaefer | |
| 2005/0037679 A1 | | 2/2005 | Theriault | |
| 2006/0186556 A1 | | 8/2006 | Sung | |
| 2008/0030836 A1 | | 2/2008 | Tonar et al. | |
| 2008/0315146 A1 | | 12/2008 | Brondum et al. | |
| 2011/0297852 A1 | | 12/2011 | Kameda et al. | |
| 2012/0305281 A1 | * | 12/2012 | Knoll | H01L 21/4846 174/50 |
| 2016/0024648 A1 | | 1/2016 | Bolton | |

FOREIGN PATENT DOCUMENTS

| | | |
|---|---|---|
| FR | 2785686 A1 | 5/2000 |
| WO | 2015015222 | 2/2015 |

OTHER PUBLICATIONS

F. Caturla et al., "Electroless Plating of Graphite with Copper and Nickel", J. Electrochem. Soc., vol. 142, No. 12, p. 4084-4090, Dec. 1995.
S-Bond Technologies, "How S-Bond Works", http://www.s-bond.com/s-bond-technology/how-s-bond-works, downloaded Mar. 8, 2017.
IJ Research Inc., "Graphite Metallization", http://www.ijresearch.com/graphite-metallization, downloaded Mar. 8, 2017.
SBIR STTR, Brazing of Graphite and Carbon Composites Using Thin Film Metallization, https://www.sbir.gov/sbirsearch/detail/182064, downloaded Mar. 8, 2017.
Adhesives, Sealants, Adhesive Technologies, http://www.adhesives.org/adhesives-sealants/adhesives-sealants-overview/adhesive-technologies/chemically-curing, downloaded Mar. 8, 2017.
John S. Johnson et al., "Rapid fabrication of lightweight silicon carbide mirrors", Optomechanical Design and Engineering 2002, Alson E. Hatheway, Editor, Proceedings of SPIE vol. 4771 (2002), pp. 243-253.
International Searching Authority Invitation to Pay Additional Fees PCT/US2017/022653 dated Jun. 8, 2017.
International Search Report and Written Opinion PCT/US2017/022657 dated Sep. 13, 2017.
International Search Report and Written Opinion PCT/US2017/022653 dated Aug. 22, 2017.
Chinese Patent Application No. 201780018178.0; English Translation of the First Office Action dated Nov. 1, 2019; China Patent Office; 9 pgs.

* cited by examiner

REFLECTIVE OPTICAL ELEMENT WITH HIGH STIFFNESS SUBSTRATE

This application claims the benefit of priority under 35 U.S.C. § 119 of U.S. Provisional Application Ser. No. 62/310,201 filed on Mar. 18, 2016 the content of which is relied upon and incorporated herein by reference in its entirety.

FIELD

This description pertains to optical elements. More particularly, this description pertains to optical elements with a high stiffness substrate and surface with low finish.

BACKGROUND

Size, weight and power (SWAP) are key design parameters for optical systems slated for use in applications where portability and mobility are advantageous. Size and weight can be directly impacted by the design of the optical design whereas power is indirectly impacted since lighter systems require less power to move.

Design choices for optical systems are generally based on refractive optical elements or reflective optical elements. When designing light weight optical systems, several factors favor the use of reflective optical elements. First, minimizing the number of optical elements in a system reduces the weight of the system. Maintaining system performance with fewer elements, however, requires use of optics with precision aspheric or free form surfaces. Such optics are best achieved with materials that can be diamond turned.

Second, size and weight can be reduced in multispectral systems in designs that focus all spectral bands through a single aperture. Due to the wavelength dependence of refractive index, multispectral focusing is difficult to accomplish with refractive optics. Reflective optics, however, can readily focus light over wide spectral ranges to a common focal point.

Third, system weight can be reduced by minimizing the weight of individual optical elements. Light weighting can be achieved, for example, through structural optimizations such as thinning the optical element. Thinning, however, is impractical for refractive optics because refractive power requires sufficient thickness of the optic. The optical effect in reflective optics, in contrast, depends only on the surface region and it is generally possible to thin the substrate supporting the reflective surface to a degree consistent with requirements of mechanical integrity.

Fourth, system weight can be reduced by selecting low density materials for optical elements. The need for transmissivity through refractive optics limits the selection of materials and prevents the use of many desirable substrates. Far fewer limitations apply to substrates for reflective elements. Even if a particular substrate material has poor reflection over a spectral band of interest, it is normally possible to achieve desired performance by depositing a thin reflective film on the surface of the substrate.

Based on the above considerations, reflective optics utilizing low density, structurally optimized mirrors that feature surfaces amenable to diamond turning to achieve low finish have become the preferred design choice for wide or multiband portable optical systems.

As new applications emerge, more demanding requirements are imposed on reflective optical elements. There is currently a need for light weight reflective optical elements that can maintain precise figure under dynamic conditions for both aerospace and commercial applications. For commercial applications, high speed scanners require lightweight mirrors to maintain the reflective surface flatness under extreme oscillating or rotating acceleration loads. For airborne surveillance and targeting applications, lightweight mirrors are required to maintain accurate figure under the aircraft vibration and thermal environments. For space applications, lightweight mirrors are required to maintain accurate figure under various actuating and/or spacecraft accelerations and thermal environments. For spacecraft, weight is also a major consideration due to the cost per pound of launching a satellite into space. Also, for space environments, materials that block cosmic radiation are often an advantage and/or are required to protect the detectors.

The need for lightweight mirrors that maintain precise figure under demanding conditions has motivated a search for new low density substrates that exhibit high stiffness.

SUMMARY

The present disclosure provides a high stiffness substrate for optical elements. The substrate includes a graphite finishing layer and a non-oxide ceramic base substrate. The non-oxide ceramic base substrate is preferably a carbide, such as boron carbide or silicon carbide. The graphite finishing layer includes a surface with low finish. Low finish is achieved by diamond turning or polishing the graphite surface. The graphite finishing layer may be joined to the non-oxide base ceramic with a solder. A supplemental finishing layer may be formed on the graphite finishing layer. A reflective stack may be formed on the graphite or supplemental finishing layer. Methods for making the substrate are also described.

The present disclosure extends to:
An optical element comprising:
a base substrate, said base substrate comprising a non-oxide ceramic; and
a finishing layer in direct or indirect contact with said base substrate, said finishing layer comprising graphite.

The present disclosure extends to:
A method of making an optical element comprising:
joining a finishing layer assembly to a base substrate assembly, said finishing layer assembly including a finishing layer comprising graphite, said base substrate assembly including a base substrate comprising a non-oxide ceramic.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale.

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Disclosed are components (including materials, compounds, compositions, and method steps) that can be used for, in conjunction with, in preparation for, or as embodiments of the disclosed reflective optical elements and methods for making reflective optical elements. It is understood that when combinations or subsets, interactions of the components are disclosed, each component individually and each combination of two or more components is also contemplated and disclosed herein even if not explicitly stated. If, for example, if a combination of components A, B, and C is disclosed, then each of A, B, and C is individually disclosed as is each of the combinations A-B, B-C, A-C, and A-B-C. Similarly, if components D, E, and F are individually disclosed, then each combination D-E, E-F, D-F, and D-E-F is also disclosed. This concept applies to all aspects of this disclosure including, but not limited to, components corresponding to materials, compounds, compositions, and steps in methods.

In this specification and in the claims which follow, reference will be made to a number of terms which shall be defined to have the following meanings:

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for components, and like aspects, and ranges thereof, are for illustration only; they do not exclude other defined values or other values within defined ranges. The compositions and methods of the disclosure include those having any value or any combination of the values, specific values, more specific values, and preferred values described herein.

As used herein, contact refers to direct contact or indirect contact. Elements in direct contact touch each other. Elements in indirect contact do not touch each other, but are otherwise joined. Elements in contact may be rigidly or non-rigidly joined. Contacting refers to placing two elements in direct or indirect contact. Elements in direct (indirect) contact may be said to directly (indirectly) contact each other.

Ordering of layers in a sequence of layers in the present optical elements will be described relative to the substrate. Description of the ordering of the layers herein is irrespective of the orientation of the substrate. The substrate forms the base of the optical element.

As used herein, the term "on" refers to direct or indirect contact. If one layer is referred to herein as being on another layer, the two layers are in direct or indirect contact.

Unless otherwise specified herein, the terms "finish" or "surface finish" refer to the root-mean-square (rms) roughness of a surface. A surface with low roughness is said to have a low finish and a surface with high roughness is said to have a high finish. Optical surfaces with low finish are smoother and are preferable for the optical elements described herein. As used herein "low finish" refers to a surface having a root-mean-square (rms) roughness as disclosed herein.

Reference will now be made in detail to illustrative embodiments of the present description.

The present description provides a substrate for reflective optical elements. The substrate has light weight, high stiffness, and a surface with a low finish or a surface capable of being processed to a low finish. The present description also provides reflective optical elements utilizing the substrate. The reflective optical element may also include a reflective layer or a reflective stack on the surface of the substrate. A reflective stack is a combination of two or more layers that cooperate to provide reflection or other optical effect.

The substrate may include a base substrate and a finishing layer on the base substrate. The finishing layer is in direct or indirect contact with the base substrate. As used herein, a finishing layer is a layer having a surface that can be processed to a low finish. A reflective layer or reflective stack may be formed directly on the finishing layer. If the finishing layer is absent, the reflective layer or reflective stack may be formed directly on the base substrate.

The substrate may include one or more intervening layers between the finishing layer and the base substrate. The one or more intervening layers may include a metallization layer, an adhesion layer, and/or a solder layer. The one or more intervening layers may improve adhesion between the finishing layer and the base substrate.

Selection of the base substrate is motivated by the design objectives of light weight and retention of figure in mechanically demanding applications. One important property guiding selection of the base substrate material is specific stiffness, which is defined as the ratio (E/ρ) of elastic modulus (E) to density (ρ). Other relevant material properties include thermal expansion (CTE), dimensional stability, environmental compatibility (corrosion, radiation), finishing capabilities (e.g. ability to diamond turn and/or polish to optical quality); compatibility with reflective coatings, and cost.

For extreme lightweight mirrors, beryllium (Be) is the de facto standard. Be has the highest specific stiffness of any metal (E=4.25×10$^7$ lf/in$^2$, ρ=0.067 lb$_m$/in$^3$, E/ρ=6.34×10$^8$ lb$_f$-in/lb$_m$) and is suitable for space applications because its ability to block cosmic radiation. The finished cost of Be mirrors is very high, however, and Be cannot be directly machined (diamond turned) to a low finish. Low finish of Be substrates requires plating of Be with a finishing layer capable of being diamond machinable. Toxicity is a key drawback of Be. Dust or fumes from Be processing carry significant health risks (berylliosis). Because of the drawbacks associated with Be, Be mirrors are reserved for applications in which the material performance of Be far outweighs the cost (typically space applications).

The present description provides base substrates with performance comparable to Be that lack the drawbacks associated with Be. The only class of materials with specific stiffness comparable to Be is ceramics. Non-oxide ceramics, in particular, have high specific stiffness. In embodiments herein, the base substrate is a non-oxide ceramic. Preferred base substrates in accordance with the present description include carbides. Representative carbides include boron carbide and silicon carbide. Boron carbide has a specific stiffness of 7.47×10$^8$ lb$_f$-in/lb$_m$ and silicon carbide has a specific stiffness of 5.54×10$^8$ lb$_f$-in/lb$_m$. Boron carbide blocks cosmic radiation and can be used in aerospace applications. Both materials can also be hot pressed and/or machined to near net shape.

Carbides have not been widely used as substrates for reflective optics because they have high hardness and are not amenable to diamond turning. As a result, it becomes necessary to apply a finishing layer to carbides to achieve substrates with low finish. In applications requiring high stability of figure in mechanically demanding deployment environments, it has heretofore been challenging to find a suitable material for the finishing layer.

This description provides a finishing layer for carbide base substrates. The finishing layer is graphite or a graphite-containing material. Graphite is a low density material that features chemical inertness, low coefficient of thermal expansion, and low elastic modulus. Graphite is also diamond turnable and when used as a thin finishing layer, has little effect on figure over wide temperature ranges.

The substrate may include a ceramic base substrate with a finishing layer. In some embodiments, the ceramic base substrate is a non-oxide ceramic and the finishing layer is graphite or a graphite-containing material. The base substrate may comprise or consist essentially of a non-oxide ceramic. The finishing layer may comprise or consist essentially of graphite. In some embodiments, the non-oxide ceramic is a carbide and the substrate includes a carbide base substrate and a finishing layer. In some embodiments, the substrate includes a carbide base substrate and graphite or a graphite-containing material as a finishing layer. One preferred embodiment includes a substrate with boron carbide as a base substrate and graphite as a finishing layer. Another preferred embodiment includes a substrate with silicon carbide as a base substrate and graphite as a finishing layer. Graphite may be in direct or indirect contact with the base substrate.

The specific stiffness of the ceramic base substrate may be at least 2.0×10$^8$ lb$_f$-in/lb$_m$, or at least 4.0×10$^8$ lb$_f$-in/lb$_m$, or at least 6.0×10$^8$ lb$_f$-in/lb$_m$, or at least 7.0×10$^8$ lb$_f$-in/lb$_m$, or in the range from 2.0×10$^8$ lb$_f$-in/lb$_m$ to 1.0×10$^9$ lb$_f$-in/lb$_m$, or in the range from 3.0×10$^8$ lb$_f$-in/lb$_m$ to 9.0×10$^8$ lb$_f$-in/lb$_m$, or in the range from 4.0×10$^8$ lb$_f$-in/lb$_m$ to 8.0×10$^9$ lb$_f$-in/lb$_m$, or in the range from 4.5×10$^8$ lb$_f$-in/lb$_m$ to 7.5×10$^9$ lb$_f$-in/lb$_m$.

Graphite may be deposited directly on the base substrate or formed independent of the base substrate and joined to the base substrate. Graphite may be formed by hot isostatic pressing of graphite powder, sputtering, or a vapor deposition technique. Graphite may be machined, diamond turned, or polished before or after joining to the base substrate. In one embodiment, graphite is formed independent of the base substrate and is processed to a shape that conforms to the shape of the surface of the base substrate. Graphite may also be obtained from a commercial source. Low porosity graphite is preferred.

To improve durability and/or adhesion, in certain embodiments, one or more intervening layers may be placed between graphite and the base substrate. The one or more intervening layers may include a metallization layer, an adhesion layer, a metal carbide-forming layer and/or a solder layer.

Metallization layers include Si. The metallization layer may be formed on the graphite finishing layer and/or the base substrate before joining the graphite finishing layer and base substrate. The surface to which the metallization layer is applied may be roughened before applying the metallization layer. Surface roughening may be achieved by grinding (to form random surface features or surface features such as grooves or ridges that are aligned), bead blasting, or with an elastomeric release sheet having embedded particles arranged in a desired pattern to create an engineered surface with controlled roughness. The roughened surface may improve adhesion of the metallization layer to the surface of a graphite finishing layer and/or surface of a carbide base substrate.

A metal carbide-forming layer may be formed on the surface of a graphite finishing layer and/or carbide base substrate before joining the graphite finishing layer and carbide base substrate. The metal carbide-forming layer may be a metal (e.g. Ti, Zr, Y, or Cr) capable of forming an interfacial metal carbide layer with graphite and/or the carbide base substrate. The metal carbide-forming layer may be between a graphite finishing layer and a carbide base substrate. In embodiments, a metal carbide-forming layer is in direct contact with a graphite finishing layer and a carbide base substrate is in direct contact with the metal carbide-forming layer. Separate metal carbide-forming layers may be formed on a graphite finishing layer and a carbide base substrate and separate metallization layers may be formed on the metal carbide-forming layers formed on each of a graphite finishing layer and a carbide base substrate.

In embodiments, the interfacial metal carbide layer may improve adhesion with an overlying metallization layer. In embodiments, a metal carbide-forming layer is formed between a graphite finishing layer and a metallization layer. The metal-carbide forming layer may be in direct contact with the graphite finishing layer and the metallization layer may be in direct contact with the metal carbide-forming layer. In embodiments, a metal carbide-forming layer is formed between a carbide base substrate and a metallization layer. The metal-carbide forming layer may be in direct contact with the carbide base substrate and the metallization layer may be in direct contact with the metal carbide-forming layer.

The solder layer may contain Ti or a rare earth element. The composition of the solder may inhibit formation of oxide or nitride barrier layers at the surface of the base substrate and/or finishing layer. In some embodiments, the solder layer is applied directly to either or both of a graphite finishing layer and a carbide base substrate. In other embodiments, a metallization layer is present on a graphite finishing layer and/or carbide base substrate and a solder is applied directly to the metallization layer. The metallization layer may adhere strongly to the graphite finishing layer and/or carbide base substrate and the solder may be selected to adhere strongly to the metallization layer. The solder preferably has a low melting point (less than 250° C., or less than 225° C., or less than 200° C., or less than 175° C.) to reduced temperature-induced shape distortions when joining the finishing layer and base substrate. Solder layers include commercial metal solders such as S-Bond 220 (a lead-free solder based on Sn—Ag—Ti alloys, available from S-Bond Technologies (Lansdale, Pa.)) or S-Bond 220M (a lead-free solder based on Sn—Ag—Ti—Mg alloys, available from S-Bond Technologies (Lansdale, Pa.)). Indium solders optimized for joining of non-metallic materials, such as solders #1E, #3, #4, #290 available from Indium Corporation (Utica, N.Y.) may also be used. The thickness of the solder layer may be less than 4.0 mil, or less than 3.0 mil, or less than 2.0 mil, or less than 1.0 mil, or between 0.25 mil and 4.0 mil, or between 0.5 mil and 3.0 mil, or between 0.75 mil and 2.5 mil, or between 1.0 mil and 2.0 mil.

Adhesion layers include metals (e.g. Ti, Zr, Yb, Cr, Pd). The adhesion layer may be applied as a separate layer or embedded in graphite. An adhesion layer may be included between a metallization layer and the graphite finishing layer or between a metallization layer and a carbide base substrate. In one embodiment, an Si metallization layer is formed on a metal adhesion layer and a solder layer is formed on the Si metallization layer. The Si metallization layer may improve wetting of the solder and the adhesion layer may improve adhesion of the Si metallization layer to a graphite finishing layer and/or base carbide substrate.

The one or more intervening layers may also include an organic adhesive layer. The organic adhesive layer may be formed from an organic adhesive that is thermally curable, moisture curable, or radiation curable. Representative organic adhesives include epoxies, epoxy resins, phenol-formaldehyde resins, silicones, urethanes, urethane prepolymers, acrylates, and methacrylates. The organic adhesive may also contain discrete particles of a material with a low coefficient of thermal expansion (e.g. glass) to increase stiffness and reduce the overall coefficient of thermal expansion of the organic adhesive. The thickness of the organic adhesive layer may be less than 2.0 mil, or less than 1.5 mil, or less than 1.0 mil, or less than 0.5 mil, or between 0.25 mil and 2.0 mil, or between 0.5 mil and 1.5 mil, or between 0.75 mil and 1.25 mil.

In one embodiment, the reflective optical element includes a graphite finishing layer in direct contact with a carbide base substrate. In a second embodiment, the reflective optical element includes a graphite finishing layer in direct contact with a metallization layer and a metallization layer in direct contact with a carbide base substrate. In a third embodiment, the reflective optical element includes a graphite finishing layer in direct contact with a solder layer and a solder layer in direct contact with a carbide base substrate. In a fourth embodiment, the reflective optical element includes a graphite finishing layer in direct contact with an organic adhesive layer and an organic adhesive layer in direct contact with a carbide base substrate. In a fifth embodiment, the reflective optical element includes a graphite finishing layer in direct contact with a metallization layer, a metallization layer in direct contact with a solder layer, and a solder layer in direct contact with a carbide base substrate. In a sixth embodiment, the reflective optical element includes a graphite finishing layer in direct contact with a first metallization layer, a first metallization layer in direct contact with a solder layer, a solder layer in direct contact with a second metallization layer, and a second metallization layer in direct contact with a carbide base substrate.

Figure 1:
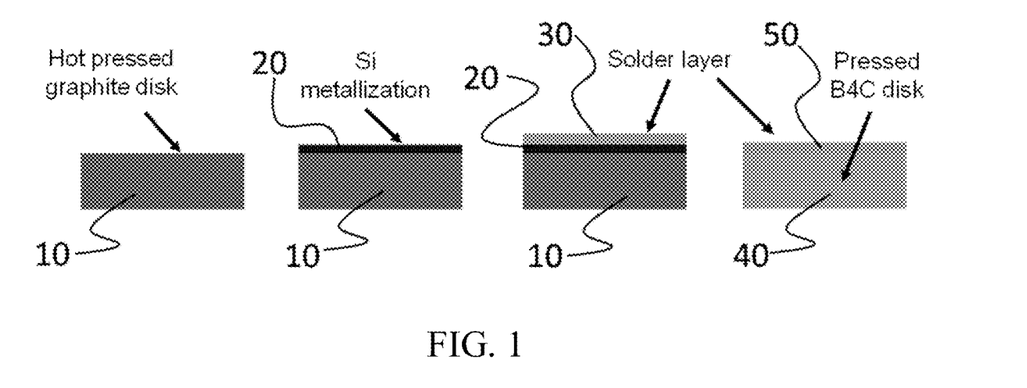
FIG. 1 is a schematic depiction of fabrication of a graphite finishing layer and boron carbide base substrate.

FIG. 1 illustrates initial steps in an embodiment for fabricating a substrate in accordance with the present description. In this example, a graphite finishing layer was formed independent of a boron carbide base substrate and the graphite finishing layer and boron carbide base substrate are joined. The graphite finishing layer 10 is formed by a hot pressing technique and configured as a disk. A typical diameter for a graphite disk is 2 inches. One surface of graphite finishing layer 10 was polished. If desired, the graphite surface may be processed to a particular shape (e.g. flat, curved, spherical, aspherical). A silicon metallization layer 20 was formed by sputtering on the polished surface graphite finishing layer 10. The thickness of silicon metallization layer 20 was between 25 μm and 50 μm. A solder layer 30 was formed on silicon metallization layer 20. To form the solder layer, the graphite finishing layer 10 with silicon metallization layer 20 was heated and a pellet of solder was deposited on the surface. After the pellet softened, a scraper tool was used to distribute the solder uniformly across the surface of silicon metallization layer 20. The scraper tool may also remove surface oxides that may form on the Si metallization layer to expose underlying unoxidized Si, which is expected to provide better solder wetting than oxidized forms of Si. S-Bond SB220M solder was used in the example of FIG. 1.

A carbide base substrate 40 was prepared separately. Carbide base substrate 40 was a boron carbide base substrate made through powder pressing and firing under an inert gas atmosphere (e.g. Ar) at 2100° C.-2200° C. Carbide base substrate 40 was configured as a disk. The approximate chemical formula of carbide base substrate 40 was $B_4C$. One surface of carbide base substrate 40 was polished. If desired, a surface of the carbide base substrate may be processed to complement the shape of a shaped surface of graphite finishing layer 10. If, for example, graphite finishing layer 10 has a surface with a convex shape, a surface of carbide base substrate 40 may have a concave shape to facilitate joining of graphite finishing layer 10 with carbide base substrate 40. Solder layer 50 was formed directly on the surface of carbide base substrate 40. To form solder layer 50, carbide base substrate 40 was heated, a pellet of solder was placed on the surface, and upon softening, the solder was scraped to provide a uniform layer. S-Bond SB220M solder was used for solder layer 50.

Figure 2:
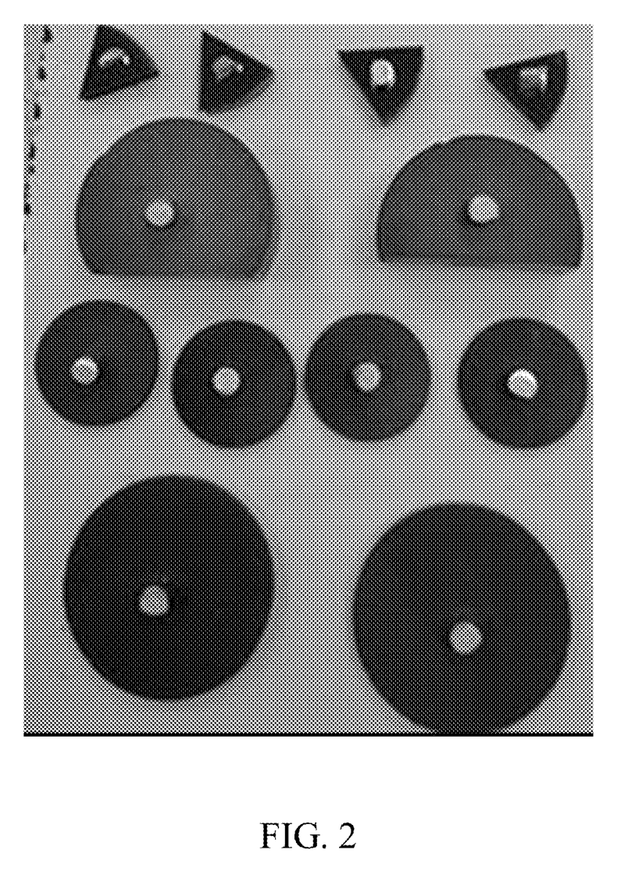
FIG. 2 is an image of graphite, silicon carbide, and boron carbide with solder pellets placed on the surface.
Figure 3:
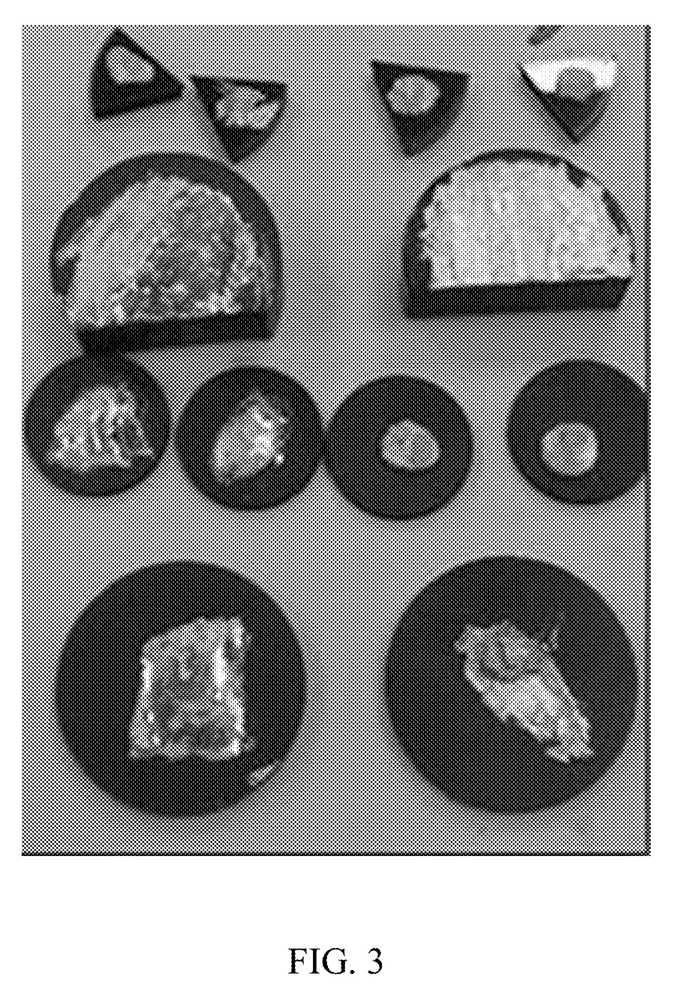
FIG. 3 shows the image of FIG. 2 after softening and spreading of the solder pellets.

FIG. 2 shows images of samples of graphite finishing layers (pie-shaped samples in top row), silicon carbide base substrates (two truncated circular samples in second row) and boron carbide base substrates (bottom two rows) with solder pellets before softening. The samples of graphite finishing layer included a silicon metallization layer and a solder pellet was placed directly on the silicon metallization layer. The samples of silicon carbide base substrates and boron carbide base substrates lacked a silicon metallization layer and the solder pellets were placed directly the surface. FIG. 3 shows images of the same samples after softening of the solder. As noted hereinabove, the softened solder was scraped across the surface to provide a more uniform solder layer.

Figure 4:
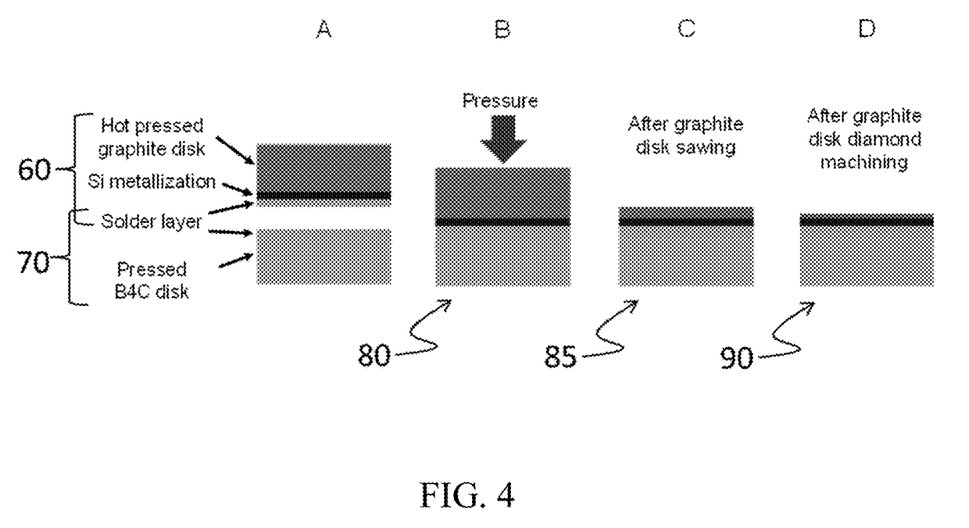
FIG. 4 is a schematic depiction of joining a finishing layer assembly and a base substrate assembly to form a substrate.

FIG. 4 shows joining of a finishing layer assembly to a base substrate assembly to form a substrate. The base substrate assembly includes the boron carbide base substrate shown in FIG. 1 and the finishing layer assembly includes the graphite finishing layer shown in FIG. 1. Finishing layer assembly 60 includes graphite finishing layer 10, silicon metallization layer 20, and solder layer 30. Base substrate assembly 70 includes boron carbide base substrate 40 and solder layer 50. Finishing layer assembly 60 and base substrate assembly 70 are oriented so that solder layer 30 faces solder layer 50 (shown at A in FIG. 4). Finishing layer assembly 60 and base substrate assembly 70 are then joined by applying mechanical force to press them together to form substrate 80 (shown at B in FIG. 4). A lateral shearing force may also be applied. Joining is performed while solder layer 30 and solder layer 50 are molten. The mechanical force thins solder layer 30 and solder layer 50, provides a uniform solder layer, and eliminates gaps or air bubbles within solder layer 30, solder layer 50 or the interface between solder layer 30 and solder layer 50. Excess solder that extrudes away from the interface is removed. Thinning of the solder layer is desirable because most solders have high coefficients of thermal expansion and thus deform when exposed to high temperature environments. Deformation of the solder may cause repositioning or misalignment of substrate 80 during deployment.

Figure 5:
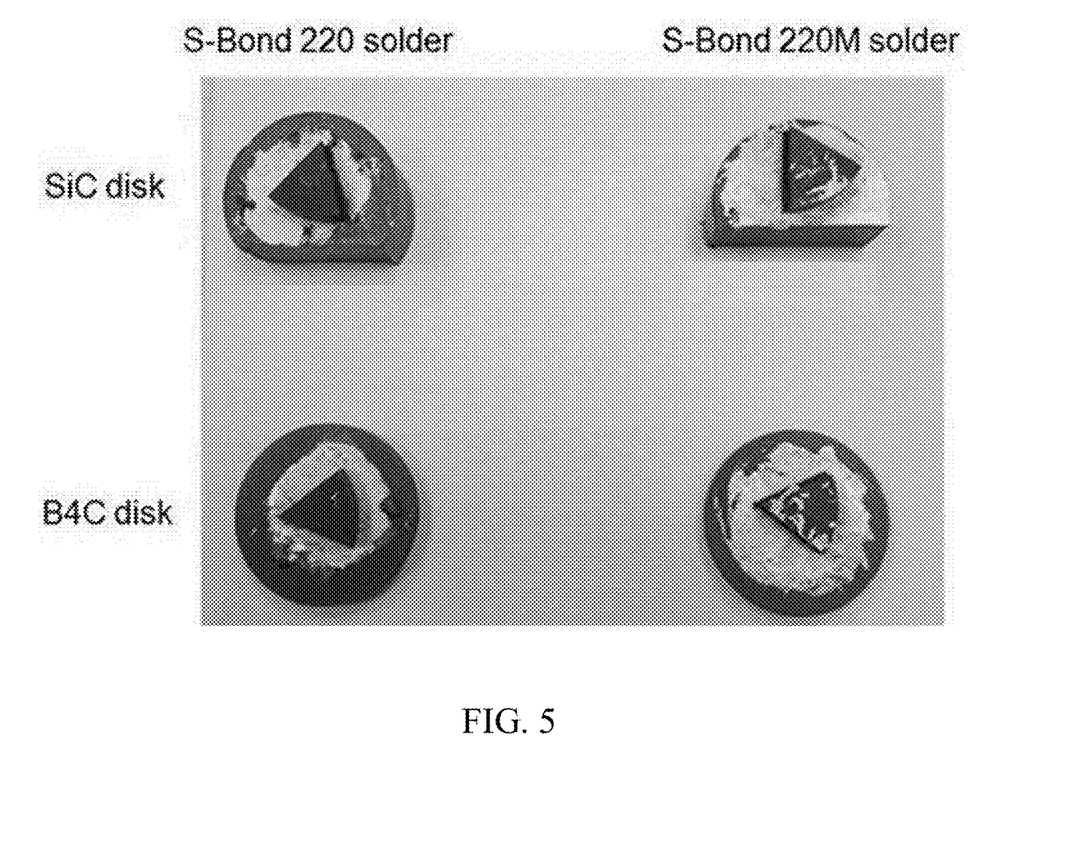
FIG. 5 is an image of substrates that include a graphite finishing layer and non-oxide ceramic base substrates.

FIG. 5 shows representative substrates made by joining various samples depicted in FIG. 3. The upper pie-shape sample is a graphite finishing layer with a silicon metallization layer on its joined surface. The larger lower samples are non-oxide ceramic base substrates. Silicon carbide (SiC) and boron carbide ($B_4C$) base substrates are shown as listed in FIG. 5. The light-colored layer on the surface of the base substrates is a solder layer. Two different solders were used (S-Bond 220 and S-Bond 220M). Solder at the interface between the graphite finishing layer and the non-oxide ceramic base substrate joins the pieces together to form substrates.

After joining, substrate 80 is cooled and then thinned by removing a portion of graphite finishing layer 10 to form substrate 85 (shown at C in FIG. 4). Removal of graphite finishing layer 10 can be accomplished by sawing, grinding, polishing, or otherwise abrading or depleting material from the surface of graphite finishing layer 10. Boron carbide base substrate 40 may also be thinned to further reduce the weight of substrate 85. After thinning, the graphite surface of substrate 80 may be further processed by polishing or diamond turning to a low finish (shown at D in FIG. 4). A reflecting layer or reflecting stack may subsequently be formed on the graphite surface of substrate 80.

Figure 6:
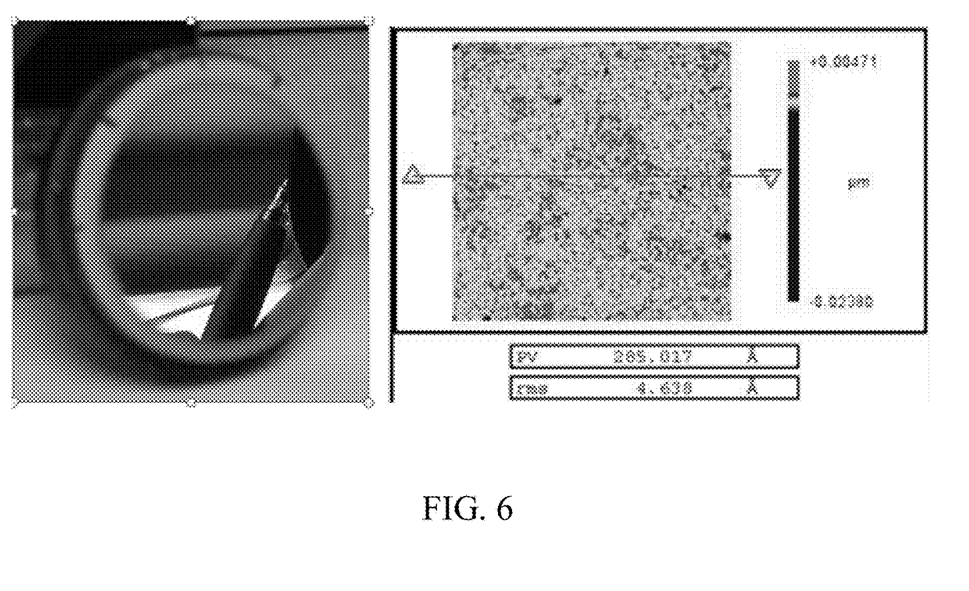
FIG. 6 is an image of a boron carbide substrate with a graphite finishing layer on the surface.

FIG. 6 depicts a sample having a graphite layer on a boron carbide substrate and an image of the surface of the graphite layer. The image indicates that the peak-to-valley roughness of the surface of the graphite layer is 285 Å and that the finish (rms roughness) of the graphite layer is 4.6 Å.

In different embodiments, the finish (rms roughness) of a surface of a graphite or graphite-containing finishing layer is less than 500 Å, or less than 300 Å, or less than 200 Å, or less than 100 Å, or less than 50 Å, or less than 25 Å, or less than 10 Å, or in the range from 5 Å to 500 Å, or in the range from 10 Å to 400 Å, or in the range from 25 Å to 500 Å, or in the range from 50 Å to 300 Å, or in the range from 50 Å to 200 Å, or in the range from 50 Å to 150 Å, or in the range from 50 Å to 100 Å, or in the range from 100 Å to 500 Å, or in the range from 100 Å to 300 Å. In different embodiments, the peak-to-valley (PV) roughness of a surface of a graphite or graphite-containing finishing layer is less than 1500 nm, or less than 1250 nm, or less than 1000 nm, or less than 750 nm, or less than 500 nm, or less than 400 nm, or less than 300 nm.

In certain embodiments, a supplemental finishing layer is formed on the graphite surface of a substrate. Representative supplemental finishing layers for a graphite surface include metals, oxides, DLC (diamond-like carbon), B and Si. Metals include Ni, Cu, W, Ti, Zr, Hf, Nb, Ta, Mo, and Au. Oxides include $Al_2O_3$ and $SiO_2$. Zr, Hf, Nb, Ta, Mo, $Al_2O_3$, and $SiO_2$ have coefficients of thermal expansion that are similar to the coefficient of thermal expansion of graphite and may be advantageous when the intended application of the optical element includes exposure to temperatures that vary over a wide range. The supplemental finishing layer on the graphite surface may also be a reflective layer. The supplemental finishing layer on the graphite surface may be polished or diamond turned to a low finish. The supplemental finishing layer on the graphite surface may be selected so as to permit attainment of a lower finish than would be possible from a graphite surface alone.

The finish (rms roughness) of a surface of the supplemental finishing layer may be less than 300 Å, or less than 200 Å, or less than 100 Å, or less than 50 Å, or less than 30 Å, or in the range from 25 Å to 300 Å, or in the range from 25 Å to 250 Å, or in the range from 25 Å to 200 Å, or in the range from 25 Å to 150 Å, or in the range from 25 Å to 100 Å, or in the range from 40 Å to 200 Å, or in the range from 40 Å to 125 Å. The peak-to-valley (PV) roughness of a surface of the supplemental finishing layer may be less than 1000 nm, or less than 80 nm, or less than 600 nm, or less than 400 nm, or less than 300 nm.

The substrate disclosed herein may function as a substrate for an optical element that include a variety of reflective layers or reflective stacks formed on a finished graphite surface or on a supplemental finishing layer formed on a graphite finishing layer. The reflective coating preferably provides high reflectivity in one or more of the visible (VIS), near infrared (NIR), shortwave infrared (SWIR), midwave infrared (MWIR), and long wave infrared (LWIR) bands. The reflective coating may be a layer of a single material or a multilayer stack of two or more materials. In one embodiment, the reflective coating includes a reflective layer and one or more tuning layers. The reflective coating may optionally include a barrier layer, one or more interface layers, and one or more protective layers. When present, the one or more protective layers overlie the other layers in the stack.

The reflective layer may include a metal layer or a transition metal layer. The reflective layer preferably has high reflectivity at wavelengths in the VIS, NIR, SWIR, MWIR, and LWIR spectral bands. The reflective metal may be metallic, non-ionic, a pure metal or metal alloy, and/or zero valent. The reflective layer may include one or more elements selected from the group consisting of Ag, Au, Al, Rh, Cu, Pt and Ni. The thickness of the reflective transition metal layer may be in the range from 75 nm to 350 nm, or in the range from 80 nm to 150 nm, or in the range from 90 nm to 120 nm.

The reflective coating may include one or more tuning layers. The one or more tuning layers are positioned between the protective layer(s) of the reflective coating and the graphite or supplemental finishing layer. In one embodiment, the tuning layer(s) are positioned between the reflective layer and the protective layer(s) of the reflective coating. Tuning layer(s) are designed to optimize reflection in defined wavelength regions. Tuning layer(s) typically include an alternating combination of high and low refractive index materials, or high, intermediate, and low refractive index materials. Materials used for tuning layers are preferably low absorbing in the wavelength range of from 0.4 µm to 15.0 Representative materials for tuning layers include $YbF_3$, $GdF_3$, $YF_3$, $YbO_xF_y$, $GdF_3$, $Nb_2O_5$, $Bi_2O_3$, and ZnS. The tuning layer(s) may have a thickness in the range of 75 nm to 300 nm. In one embodiment, the reflective coating includes $YbF_3$ and ZnS as tuning layers.

The reflective layer and tuning layer(s) may be in direct contact or one or more interface layers may be present between the reflective layer and tuning layer(s). The interface layer(s) may promote adhesion or provide galvanic compatibility between the reflective layer and tuning layer(s). The interface layer(s) needs to have a thickness sufficient for adhesion, but must also be thin enough to minimize absorption of light reflected from the reflective layer. The interface layer(s) positioned between the reflective layer and the tuning layer(s) may have a thickness in the range of 5 nm to 20 nm, or 8 nm to 15 nm, or 8 nm to 12 nm. The interface layer(s) positioned between the reflective layer and the tuning layer(s) may include one or more of $Nb_2O_5$, $TiO_2$, $Ta_2O_5$, $Bi_2O_3$, ZnS and $Al_2O_3$.

In one embodiment, the reflective layer is in direct contact with the graphite or supplemental finishing layer. In another embodiment, the optical element includes a barrier layer and/or an interface layer between the reflective layer and the graphite or supplemental finishing layer. In still another embodiment, the optical element includes a barrier layer in direct contact with the graphite or supplemental finishing layer. In yet another embodiment, the optical element includes a barrier layer in direct contact with the graphite or supplemental finishing layer and an interface layer in direct contact with the barrier layer. The interface layer may promote adhesion between the reflective layer and barrier layer, or between the reflective layer and the galvanic-compatibility layer. The interface layer may also insure galvanic compatibility of the reflective coating with the graphite or supplemental finishing layer, or galvanic compatibility of the barrier layer with the reflective layer. The barrier layer may insure galvanic compatibility between the reflective layer and the graphite substrate.

Representative barrier layers include $Si_3N_4$, $SiO_2$, TiAlN, TiAlSiN, $TiO_2$, DLC (diamond-like carbon), Al, CrN, and $Si_xN_yO_z$. The barrier layer may have a thickness in the range from 100 nm to 50 µm, or in the range from 500 nm to 10 µm, or in the range from 1 µm to 5 µm. One criterion for determining the thickness of the barrier is the number of hours the article will have to withstand the salt fog test. The longer the duration of the salt fog test, the greater the required thickness of the barrier layer. For a salt fog test of 24 hours, a barrier layer of 10 µm may be sufficient. The thickness of the barrier layer can also be adjusted to accommodate changes in temperature without distorting the figure of the optical element. Thermal stresses increase as the operational temperature range increases, so thinner barrier layers are recommended to avoid figure distortion in deployment environments experiencing large swings in temperature.

Representative interface layers positioned between the graphite or supplemental finishing layer and the reflective layer include one or more of Ni, Cr, Ni—Cr alloys (e.g. Nichrome), Ni—Cu alloys (e.g. Monel), Ti, $TiO_2$, ZnS, Pt, $Ta_2O_5$, $Nb_2O_5$, $Al_2O_3$, AlN, $AlO_xN_y$, Bi, $Bi_2O_3$, $Si_3N_4$, $SiO_2$, $SiO_xN_y$, DLC (diamond-like carbon), $MgF_2$, $YbF_3$, and $YF_3$. The interface layer may have a thickness in the range from 0.2 nm to 25 nm, where the lower end of the thickness range (e.g. 0.2 nm to 2.5 nm, or 0.2 nm to 5 nm) is appropriate when the interface layer is a metal (to prevent parasitic absorbance of light passing through the reflective coating) and the higher end of the thickness range (e.g. 2.5 nm to 25 nm, or 5 nm to 25 nm) is appropriate when the interface layer is a dielectric.

The protective layer provides resistance to scratches, resistance to mechanical damage, and chemical durability. Representative materials for the protective layer include $YbF_3$, $YbF_xO_y$, $YF_3$ and $Si_3N_4$. The protective layer(s) is the top layer of the reflective coating. The protective layer(s) may have a thickness in the range of 60 nm to 200 nm.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the illustrated embodiments. Since modifications, combinations, sub-combinations and variations of the disclosed embodiments that incorporate the spirit and substance of the illustrated embodiments may occur to persons skilled in the art, the description should be construed to include everything within the scope of the appended claims and their equivalents.

What is claimed is:

1. An optical element comprising:
   a base substrate, said base substrate comprising a non-oxide ceramic;
   a graphite layer in indirect contact with said base substrate, said graphite layer comprising a diamond-turned surface; and
   a metal layer positioned between said base substrate and said graphite layer, said metal layer directly contacting said non-oxide ceramic.

2. The optical element of claim 1, wherein said non-oxide ceramic comprises boron carbide or silicon carbide.

3. The optical element of claim 1, wherein said non-oxide ceramic comprises a specific stiffness of at least $4.0 \times 10^8$ $lb_f$-in/$lb_m$.

4. The optical element of claim 1, wherein said graphite layer comprises an rms surface roughness less than 25 Å.

5. The optical element of claim 1, further comprising a metallization layer, wherein said metallization layer is Si.

6. The optical element of claim 1, further comprising a solder layer, said solder layer comprising Ti or a rare earth element.

7. The optical element of claim 6, wherein said solder layer is in direct contact with said base substrate.

8. The optical element of claim 6, further comprising a first metallization layer in direct contact with said graphite layer.

9. The optical element of claim 8, wherein said solder layer is in direct contact with said first metallization layer and said first metallization layer is a layer of Si.

10. The optical element of claim 1, further comprising an organic adhesive layer between said graphite layer and said base substrate.

11. The optical element of claim 1, further comprising a reflective layer on said diamond-turned surface of said graphite layer.

12. The optical element of claim 1, wherein said base substrate comprises boron carbide.

13. The optical element of claim 1, wherein said diamond-turned surface of said graphite layer is not in direct contact with said base substrate.

14. The optical element of claim 1, wherein said graphite layer is in direct contact with said metal layer.

15. An optical element comprising
a base substrate, said base substrate comprising a non-oxide ceramic;
a graphite layer in indirect contact with said base substrate, said graphite layer comprising a diamond-turned surface;
a metal layer positioned between said base substrate and said graphite layer; and
an interfacial metal carbide layer between said base substrate and said graphite layer, said interfacial metal carbide layer comprising a metal from said metal layer.

16. The optical element of claim 15, wherein said interfacial metal carbide layer is in direct contact with said graphite layer.

17. The optical element of claim 15, wherein said metal from said metal layer is Ti, Zr, Y, or Cr.

18. The optical element of claim 15, further comprising a layer of Si between said base substrate and said graphite layer.

19. The optical element of claim 18, wherein said layer of Si is in direct contact with said interfacial metal carbide layer.

20. An optical element comprising:
a base substrate, said base substrate consisting essentially of a non-oxide ceramic; and
a graphite layer in direct or indirect contact with said base substrate, said graphite layer comprising a diamond-turned surface.

21. The optical element of claim 20, wherein said non-oxide ceramic is a carbide.

22. The optical element of claim 21, further comprising a metal layer between said base substrate and said graphite layer.

23. The optical element of claim 21, further comprising a metal carbide-forming layer between said base substrate and said graphite layer.

24. The optical element of claim 21, further comprising a layer of Si between said base substrate and said graphite layer.

25. The optical element of claim 21, further comprising a solder layer between said base substrate and said graphite layer.

26. The optical element of claim 21, further comprising a reflective layer on said graphite layer.

27. The optical element of claim 20, wherein said graphite layer is in direct contact with said non-oxide ceramic.

28. The optical element of claim 20, wherein said non-oxide ceramic is boron carbide.

* * * * *

UNITED STATES PATENT AND TRADEMARK OFFICE
CERTIFICATE OF CORRECTION

| | | |
|---|---|---|
| PATENT NO. | : 10,816,702 B2 | Page 1 of 1 |
| APPLICATION NO. | : 15/455654 | |
| DATED | : October 27, 2020 | |
| INVENTOR(S) | : James Scott Sutherland et al. | |

It is certified that error appears in the above-identified patent and that said Letters Patent is hereby corrected as shown below:

In the Claims

In Column 13, Line 11, Claim 15, delete "comprising" and insert -- comprising: --, therefor.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*